(12) United States Patent
Galloway et al.

(10) Patent No.: US 6,300,878 B1
(45) Date of Patent: Oct. 9, 2001

(54) CONSTANT CURRENT REGULATOR USING IGBT CONTROL

(75) Inventors: James H. Galloway, Brookfield; Douglas M. Giardini, Shelton, both of CT (US)

(73) Assignee: Cooper Industries, Inc., Houston, TX (US)

( * ) Notice: Subject to any disclaimer, the term of this patent is extended or adjusted under 35 U.S.C. 154(b) by 0 days.

(21) Appl. No.: 09/643,766

(22) Filed: Aug. 23, 2000

Related U.S. Application Data

(60) Provisional application No. 60/175,957, filed on Jan. 13, 2000, and provisional application No. 60/216,522, filed on Jul. 5, 2000.

(51) Int. Cl.[7] .................................................. G08B 21/00
(52) U.S. Cl. .......................... 340/642; 315/130; 315/189; 315/256; 323/262
(58) Field of Search .................................... 323/262, 259, 323/282, 284, 224; 340/945, 947, 953, 642; 315/130, 189, 256; 244/114 R

(56) References Cited

U.S. PATENT DOCUMENTS

| | | |
|---|---|---|
| 4,295,079 | 10/1981 | Otsuka et al. . |
| 4,396,868 * | 8/1983 | Wantanabe ............................ 315/130 |
| 4,675,574 * | 6/1987 | Delflache ............................ 315/130 |
| 5,034,659 * | 7/1991 | Taniguchi ............................ 315/131 |
| 5,283,726 | 2/1994 | Wilkerson . |
| 5,319,534 | 6/1994 | Brennen . |
| 5,319,535 | 6/1994 | Brennen . |
| 5,349,517 | 9/1994 | Brennen . |
| 5,355,025 | 10/1994 | Moran et al. . |
| 5,355,295 | 10/1994 | Brennen . |
| 5,359,275 | 10/1994 | Edwards . |
| 5,483,148 | 1/1996 | Torrey . |
| 5,521,487 | 5/1996 | Liu . |
| 5,526,252 | 6/1996 | Erdman . |
| 5,545,971 * | 8/1996 | Gomez et al. ........................ 323/259 |
| 5,747,972 | 5/1998 | Baretich et al. . |
| 5,751,138 | 5/1998 | Venkata et al. . |
| 5,771,161 | 6/1998 | Jackson et al. . |
| 6,020,726 * | 2/2000 | James .................................... 323/239 |

FOREIGN PATENT DOCUMENTS

| | | |
|---|---|---|
| 0 264 135 | 4/1988 | (EP) . |
| 2 320 967 | 7/1998 | (GB) . |
| WO 99/08489 | 2/1999 | (WO) . |

OTHER PUBLICATIONS

Patent Abstracts of Japan, 1 page, 11184541, Jul. 1999.

* cited by examiner

*Primary Examiner*—Shawn Riley
(74) *Attorney, Agent, or Firm*—Fish & Richardson PC

(57) ABSTRACT

A constant current regulator that receives an AC input current from a source provides a constant AC current to a load. The regulator includes first, second, third, and fourth electronically controllable switches, a transformer coupled to the switches, and a controller connected to the switches. An output of the first switch is electrically connected to an input of the second switch and one input of the transformer primary winding. An output of the third switch is electrically connected to an input of the fourth switch and another input of the transformer primary winding. The controller provides a trigger signal to each of the switches. The controller adjusts a duty cycle of the trigger signals based on a comparison between an actual current value and a reference current value to provide a constant AC current to the load.

66 Claims, 15 Drawing Sheets

| QUADRANT | V | I | "ON" | "OFF" |
|---|---|---|---|---|
| I | + | + | Q1 T1 D3 | T1 Q4 D2 |
| II | - | + | Q1 T1 D3 | T1 Q4 D2 |
| III | - | - | Q3 T1 D1 | T1 Q2 D4 |
| IV | + | - | Q3 T1 D1 | T1 Q2 D4 |

CONSTANT CURRENT REGULATOR USING IGBT CONTROL

This appln claims benefit of Provisional No. 60/175,957 filed Jan. 13, 2000 which claims benefit of Prov. No. 60/216,522 filed Jul. 5, 2000.

TECHNICAL FIELD

This invention relates to a constant current regulator using insulated gate bipolar transistor control.

BACKGROUND

Existing airport lighting systems employ a constant current regulator (CCR) that supplies power to a series of lights (or loads) used for airplane approach, touch-down, and taxi-way guidance. Because the intensity of a light is dependent upon a current through the circuit, the CCR regulates the current through the lighting system to control light intensity.

SUMMARY

The invention provides a constant current regulator that receives an AC input current from a source and provides a constant AC current to a load. To this end, the regulator includes first, second, third and fourth electronically controllable switches, a transformer coupled to the switches, and a controller connected to the switches. An output of the first switch is electrically connected to an input of the second switch and one input of the transformer primary winding. Additionally, an output of the third switch is electrically connected to an input of the fourth switch and another input of the transformer primary winding.

The controller is programmed to provide trigger signals to the switches, and to adjust the duty cycle of the trigger signals based on a comparison between an actual current value and a reference current value to provide a constant AC current to the load.

Embodiments may include one or more of the following features. For example, a trigger signal to a switch may be based on a pulse width modulated signal and delayed pulse width modulated signal, and a polarity of an AC input voltage. The switches may be arranged such that the AC input current is supplied to the primary winding of the transformer when the trigger signal to the first switch is on and when the trigger signal to the third switch is on, and the AC input current is isolated from the primary winding of the transformer when the trigger signal to the second switch is on and when the trigger signal to the fourth switch is on.

The electronically controllable switches may be insulated gate bipolar transistors (IGBTs), each IGBT having an emitter input and a collector input.

The regulator may further include, for each electronically controllable switch, a diode in an anti-parallel direction across the output and the input of the switch. The inputs of the first and third switches may be connected to the AC input. The outputs of the second and fourth switches may be electrically connected to each other.

The regulator may include first capacitor across the input of the first switch and the output of the second switch, and a second capacitor across the input of the third switch and the output of the fourth switch.

There may always be at least one switch conducting. For example, the first and fourth switches may be reciprocally and cyclically operated so that one of the first and fourth switches is conducting while the other of the first and fourth switches is non-conducting. Moreover, the second and third switches may be reciprocally and cyclically operated so that one of the second and third switches is conducting while the other of the second and third switches is non-conducting.

The controller may adjust the duty cycle of the trigger signal by adjusting a conversion ratio between a source voltage and a load voltage. Likewise, the controller may adjust the duty cycle of the trigger signal by adjusting a conversion ratio between a source current and a load current.

The load may include one or more lamps in series. The regulator may supply a constant current to each lamp such that the lamps have uniform brightness. Furthermore, the reference current value may be based on a selected brightness level for the lamps.

Output of the transformer may be fed back to the controller. Based on the feedback, the controller may compensate for changes in the conditions in the load to maintain constant current regulation.

The controller may be programmed to open a protection switch connected to the AC input and to stop providing a trigger signal to the first, second, third, and fourth switches upon detection of a fault in the AC line. A control panel may be connected to the controller.

The controller may sense the polarity of the input voltage and current to determine which switches are to be turned on in conjunction with the trigger signal. In this case, there may always be at least one switch conducting.

The regulator may also include input filtering that is provided by reactance of the AC source in conjunction with an input capacitor. The regulator may include output filtering that is provided by leakage reactance of the transformer in conjunction with an output capacitor. The regulator may include a safety resistor connected in parallel with the input capacitor to safely discharge when AC input current is removed from the regulator.

The regulator may be used in an airport lighting system to provide a constant current to each lamp in a series lamp circuit so that lamps have uniform brightness. A connected control panel may permit an air traffic controller to adjust the regulator to control the brightness of the lamps.

A feedback transformer may be coupled to a secondary winding of the transformer to provide a feedback signal to the controller. The actual output current may be based on the current value from the feedback transformer.

Other features and advantages will be apparent from the following description, including the drawings, and from the claims.

DETAILED DESCRIPTION

Figure 1:
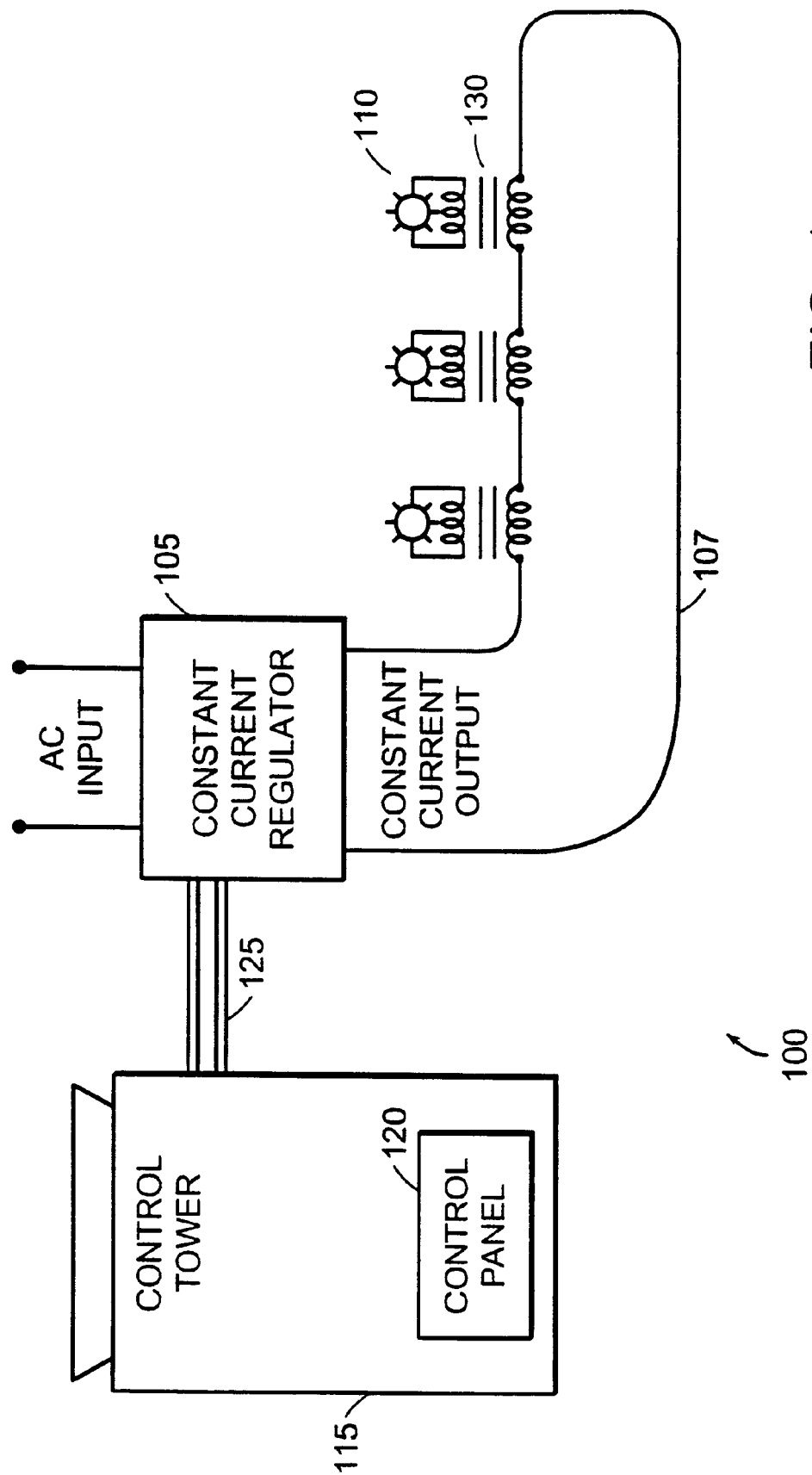
FIG. 1 is a block diagram of an airport lighting system that uses a constant current regulator (CCR).

Referring to FIG. 1, an airport lighting system 100 employs a constant current regulator (CCR) 105 to provide a constant current to a load circuit 107 that includes a series of lamps 110. An air traffic controller, residing in an air traffic control tower 115, monitors and adjusts the airport lighting system 100 using a control panel 120. The control panel 120 is housed in the air traffic control tower 115 and connected to the constant current regulator 105 via control cables 125.

The lighting system 100 uses a series lamp circuit to supply a constant current to each lamp so that the lamps have uniform brightness. Isolation transformers 130 are used to isolate the lamps 110 from the circuit 107. In particular, primary coils of the isolation transformers 130 are connected in series to form the circuit 107. The secondary coil of each isolation transformer 130 is connected to a corresponding lamp 110. This arrangement prevents the entire lighting system 100 from becoming inoperative if a single lamp burns out, since the series circuit 107 is isolated from the lamp and the isolation transformer 130 associated with the burned-out lamp self-saturates.

A Federal Aviation Administration (FAA) Specification for Constant Current Regulators and Regulator Monitors (FAA AC 150/5345-10E) sets forth requirements for constant current regulators used in airport series lighting systems such as the system 100 of FIG. 1. Any CCR design should pass all of the requirements issued in the FAA AC 150/5345-10E, including environmental, performance, detail, and monitoring requirements. The FAA AC 150/5345-10E is incorporated by reference.

According to the FAA AC 150/5345-10E, the CCR must maintain a constant effective root-mean square (RMS) output current that is independent of variations in load output voltage and of limited variations in input voltage. Control of the RMS value provides for precise control of lamp intensity because the RMS value controls the power dissipated in the lamp, and also affects the life of the lamp.

Figure 2A:
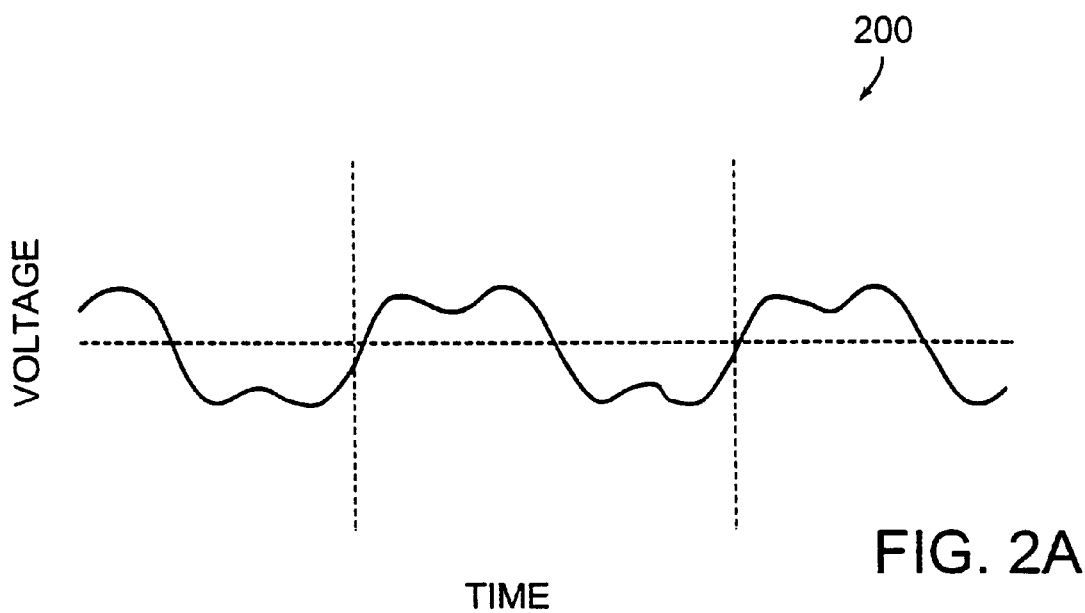
FIGS. 2A and 2B are graphs of current waveforms for a first type of current regulator used in the airport lighting system of FIG. 1.
Figure 2B:
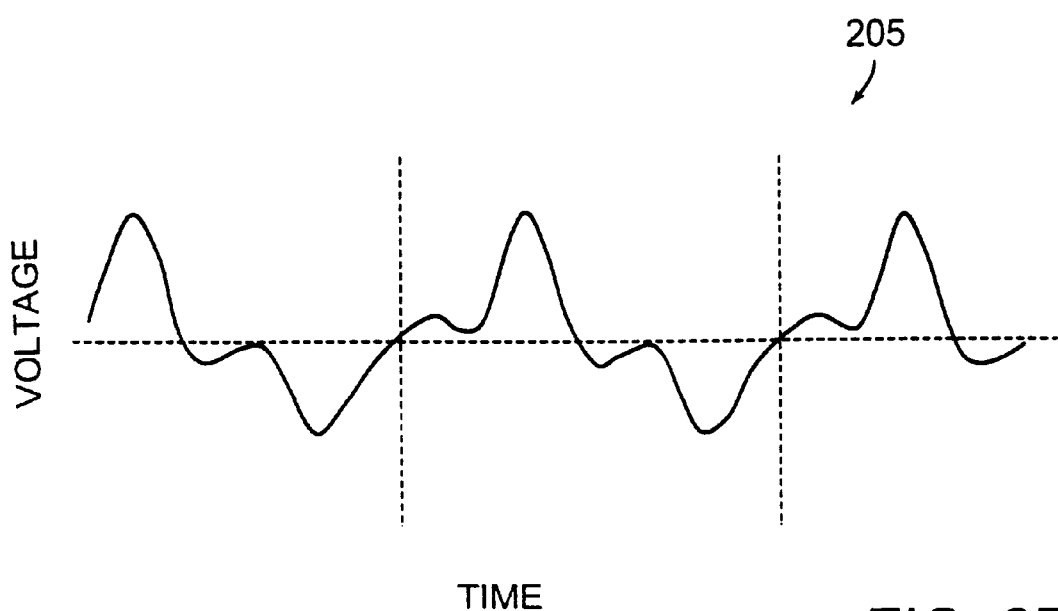

One known CCR design uses a ferro-resonant transformer on the output to provide phase control to the input signal. Ferro-resonant transformers, although meeting requirements issued by the FAA, typically have poor efficiency, large size, high cost, and excessive input current distortion. FIGS. 2A and 2B show typical input current waveforms 200, 205 for a CCR using a ferro-resonant transformer. The difference between waveform 200 and waveform 205 is due to a difference in an operating point of the CCR.

Figure 2C:
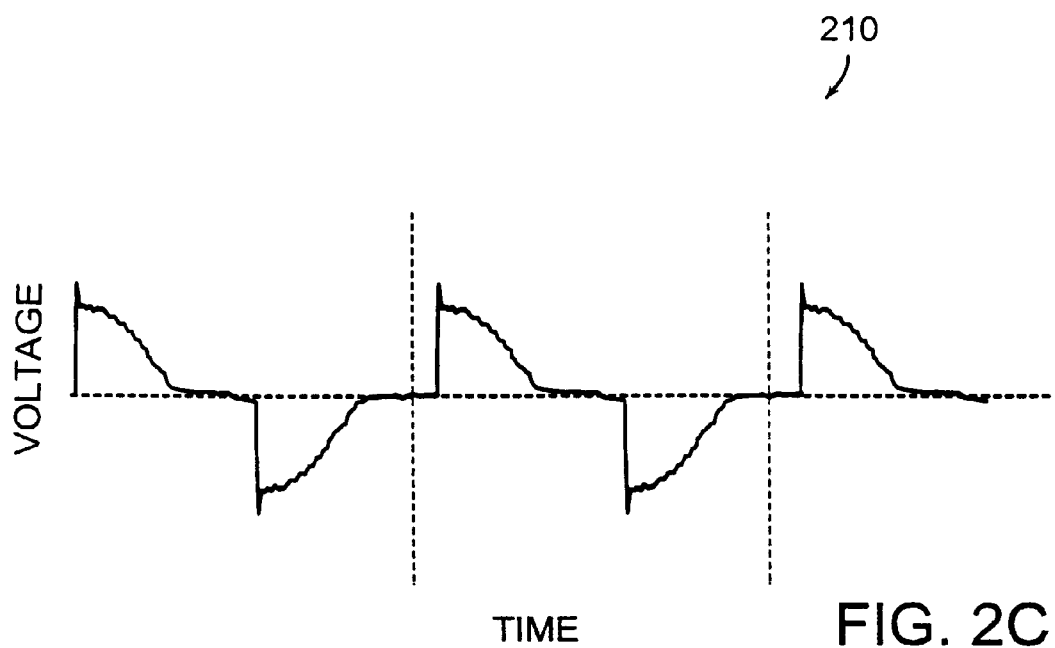
FIGS. 2C and 2D are graphs of current waveforms for a second type of current regulator used in the airport lighting system of FIG. 1.
Figure 2D:
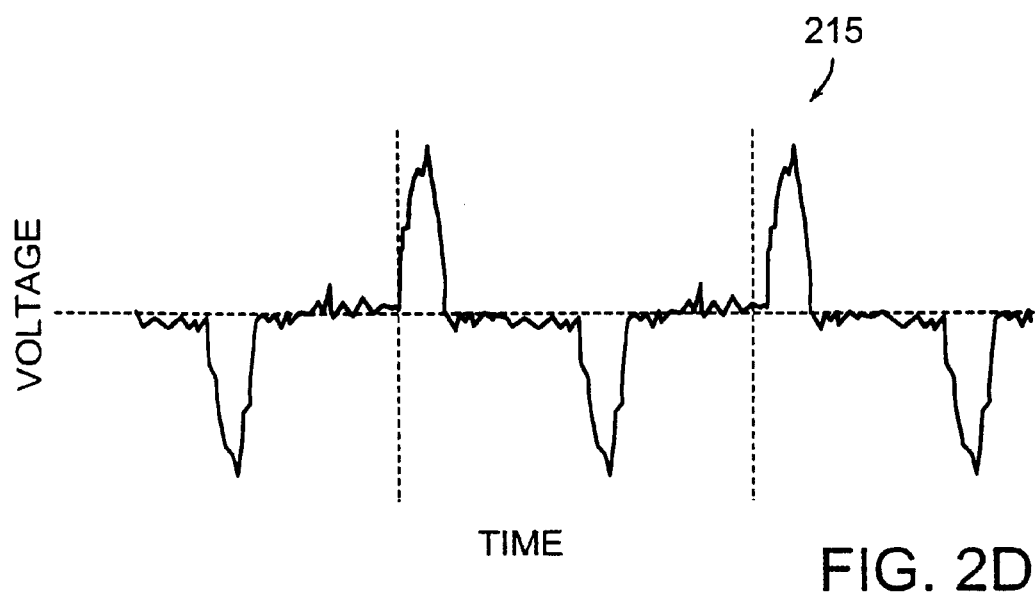

Lower cost and more efficient alternative CCRs that replace the ferro-resonant transformer with a conventional transformer also have been used. However, the lower cost and greater efficiency tends to produce an even more excessive input current distortion. For example, FIGS. 2C and 2D show typical input current waveforms 210, 215 for such an alternative CCR. As the waveforms 210, 215 indicate, input current harmonics are far in excess of acceptable levels.

Figure 3:
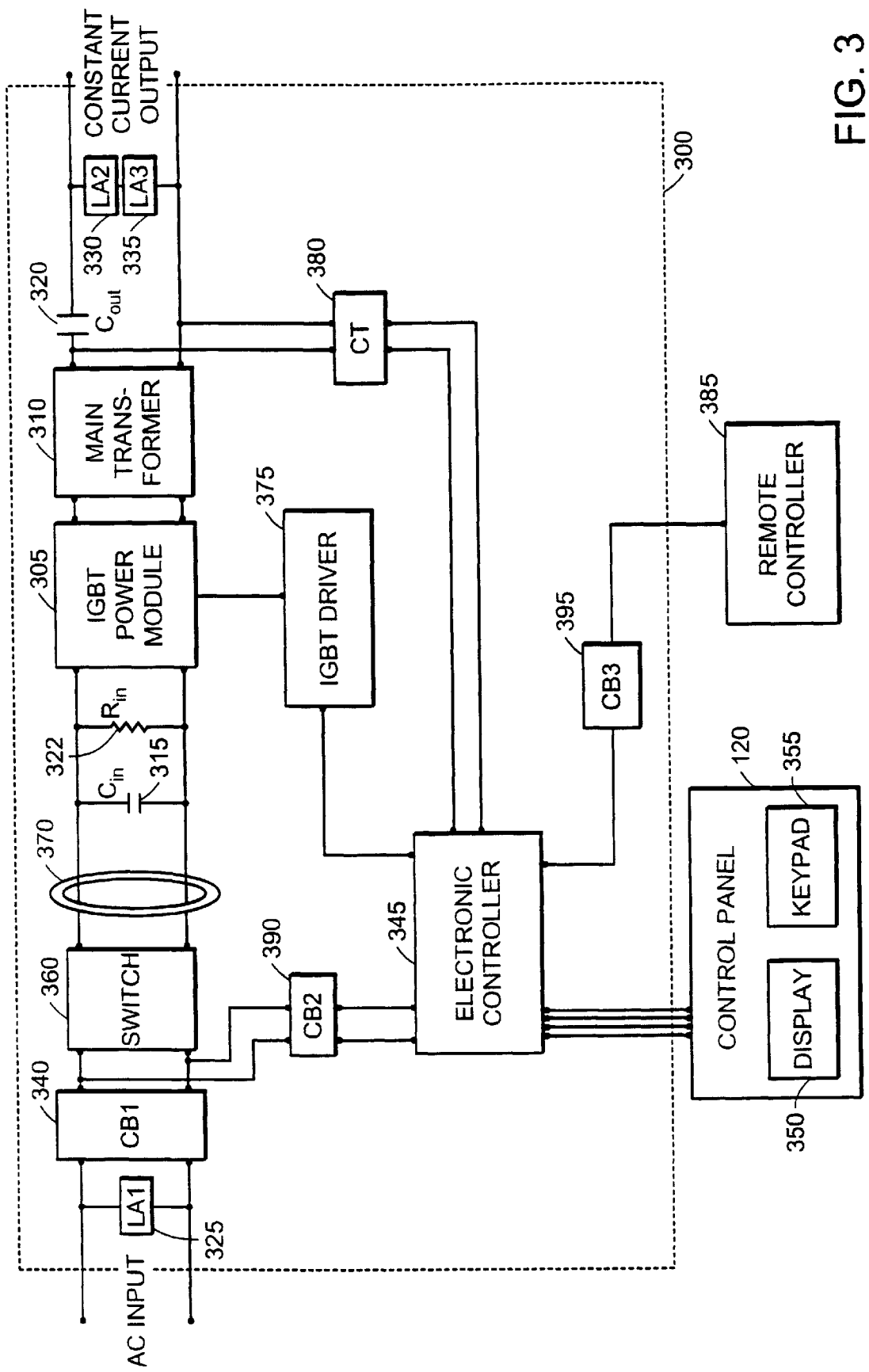
FIG. 3 is a block diagram of a CCR that uses a pulse width modulated matrix converter to regulate current.

Referring also to FIG. 3, a constant current regulator (CCR) 300 achieves a constant current output, even in response to changes to a size of a load (for example, a change in the number of lights 110) or an amplitude of an input voltage. The CCR 300 uses a pulse width modulated (PWM) matrix down-converter to meet FAA requirements and cost and efficiency requirements. The CCR 300 works equally well over a wide range of load power factors, and with a relatively simple control logic.

The CCR 300 is implemented using an insulated gate bipolar transistor (IGBT) power module 305 that, as discussed below with respect to FIG. 4, uses two pairs of IGBTs [Q1, Q2] and [Q3, Q4] implemented as solid state switches. The CCR 300 also includes a main power transformer 310, an input capacitor $C_{in}$ 315, and an output capacitor $C_{out}$ 320. Each pair of IGBTs is connected to one input of the primary winding of the main power transformer 310.

Input filtering is provided by a reactance of the AC source in conjunction with the input capacitor $C_{in}$ 315. Output filtering is provided by leakage reactance of the transformer 310 in conjunction with the output capacitor $C_{out}$ 320. A safety resistor $R_{in}$ 322 is connected in parallel with the input capacitor $C_{in}$ 315 to permit the input capacitor 315 to safely discharge when power is removed from the unit. In one implementation, $R_{in}$ is a 100 k resistor with a power rating of 5 W.

For transient protection purposes, and as required by the FAA AC 150/5345-10E, the CCR 300 is equipped with a lightning arrestor (LA1) 325 on the AC input line, and a set of lightning arrestors (LA2 and LA3) 330, 335 on the output line.

To protect the CCR 300 from an interior overcurrent condition, a circuit breaker CB1 340 is positioned on the input line. The input circuit breaker 340 also may be used to manually lock the CCR 300 in an OFF condition for maintenance purposes.

In the control tower 115, the air traffic controller uses information provided to the control panel 120 to provide input signals to an electronic controller 345. The electronic controller 345, which includes a processor and memory, controls input/output functions and regulation of the IGBTs Q1–Q4.

The control panel 120 includes a display 350 that displays CCR operating conditions and any other necessary information. The control panel 120 also includes an input device, such as a keypad 355, that accepts air traffic controller input to change operating parameters of the CCR or to shut off the CCR.

When the CCR 300 is turned on, an input switch 360, controlled by the electronic controller 345, closes to allow input power to be fed into the IGBT power module 305. An inductor L 370 is used to filter out common mode noise that is generated by the switching of the IGBT devices inside the IGBT power module 305.

Regulation of the output voltage of the CCR 300 is achieved by varying the PWM duty cycle of a trigger signal generated by an IGBT driver 375 that controls switching of the IGBTs. In particular, the IGBT power module 305 is arranged so that the AC input current to the CCR is transformed into the AC output current of the transformer 310 when the trigger signal is "ON," and is isolated from the transformer 310 when the trigger signal is "OFF". The IGBT driver 375 also provides short circuit protection for the IGBT power module 305. When the IGBT driver 375 senses a fault in the IGBT power module 305, it sends a feedback signal to the electronic controller 345 to open the switch 360; and it turns off Q1 and Q3 and turns on Q2 and Q4.

Two IGBT switches (each including one IGBT from each pair) are reciprocally and cyclically operated so that one of the switches is ON or conducting while the other is OFF or non-conducting, and vice versa. Each of the switches is turned on and off by a separate signal, with each of the signals depending on a polarity of the AC input voltage, the trigger signal, and a signal corresponding to the trigger signal delayed by a time T. Thus, as the PWM duty cycle of the trigger signal is varied, the voltage (or current) conversion ratio between source and load is also varied. For example, if Q1 is modulated at a given duty cycle D and Q4 is modulated exactly opposite to Q1 (Q4 is closed when Q1 is open and vice versa), then the output voltage is given by, $V_{out}=V_{in} \times D$. This relationship holds for either polarity of $V_{in}$ and the input current and for both IGBT switch pairs.

When excessive current or voltage is applied to electrical components, excessive heat loss and charge buildup may occur. This may result in a drop in operating efficiency. For this reason, the controller 345 senses a magnitude and/or polarity of the input voltage and current to determine which IGBT switches are to be turned on in conjunction with the trigger signal.

The IGBT power module 305, upon receiving an input from the IGBT driver 375, produces a constant output signal equal to a set level, regardless of a number of load elements in the load circuit 107. For smaller loads, the IGBT power module 305 operates at quite low duty cycles. In one application, the AC output voltage may be as high as 4500 Volts at full load with a maximum number of lamps 110 in the load circuit 107 and for a 30 kW CCR 300.

Output of the IGBT power module is applied to a primary winding of the main transformer 310. A secondary winding of the main transformer 310 is fed back to the electronic controller 345 using a load current transformer 380 to provide feedback control. Using feedback control, the CCR 300 can compensate for changes in the conditions in the load circuit 107 to maintain regulation. For example, the CCR 300 may maintain a constant RMS output current with variations of about –5% to about +10% of nominal input voltage, and load variations from shorted load to full load.

The electronic controller 345 converts an actual current of the load to a direct current (DC) value and compares this DC load current to the reference current value. The electronic controller 345 then amplifies a difference between the actual current value and the reference current value, referred to as an error signal, and adjusts the IGBT trigger signal frequency based on the error signal.

The reference current value sets a brightness level or step for the lamps 110. The brightness level may be set locally by the air traffic controller at the keypad 355 or remotely through a remote controller 385. When a different brightness step is selected, the reference current value changes and changes the duty cycle accordingly to provide a necessary power to the input of the main transformer for output current regulation.

A fuse or circuit breaker 390 (for example, CB2) may be positioned in the CCR 300 to protect the electronic controller 345, and a fuse or circuit breaker 395 (for example, CB3) may be positioned in the CCR 300 to protect the remote controller 385. Because of these safety features, the CCR 300 shuts off within a preset duration (for example, 2 seconds) after detecting an open circuit in the load circuit 107. Furthermore, the CCR 300 shuts off upon detecting an overcurrent condition in the load circuit 107 or an IGBT failure (which is detected by the IGBT driver 375). The CCR 300 also shuts off in response to an excessive drop in line voltage. An excessive drop is any drop that results in insufficient power being supplied to the electronic controller 345.

Figure 4:
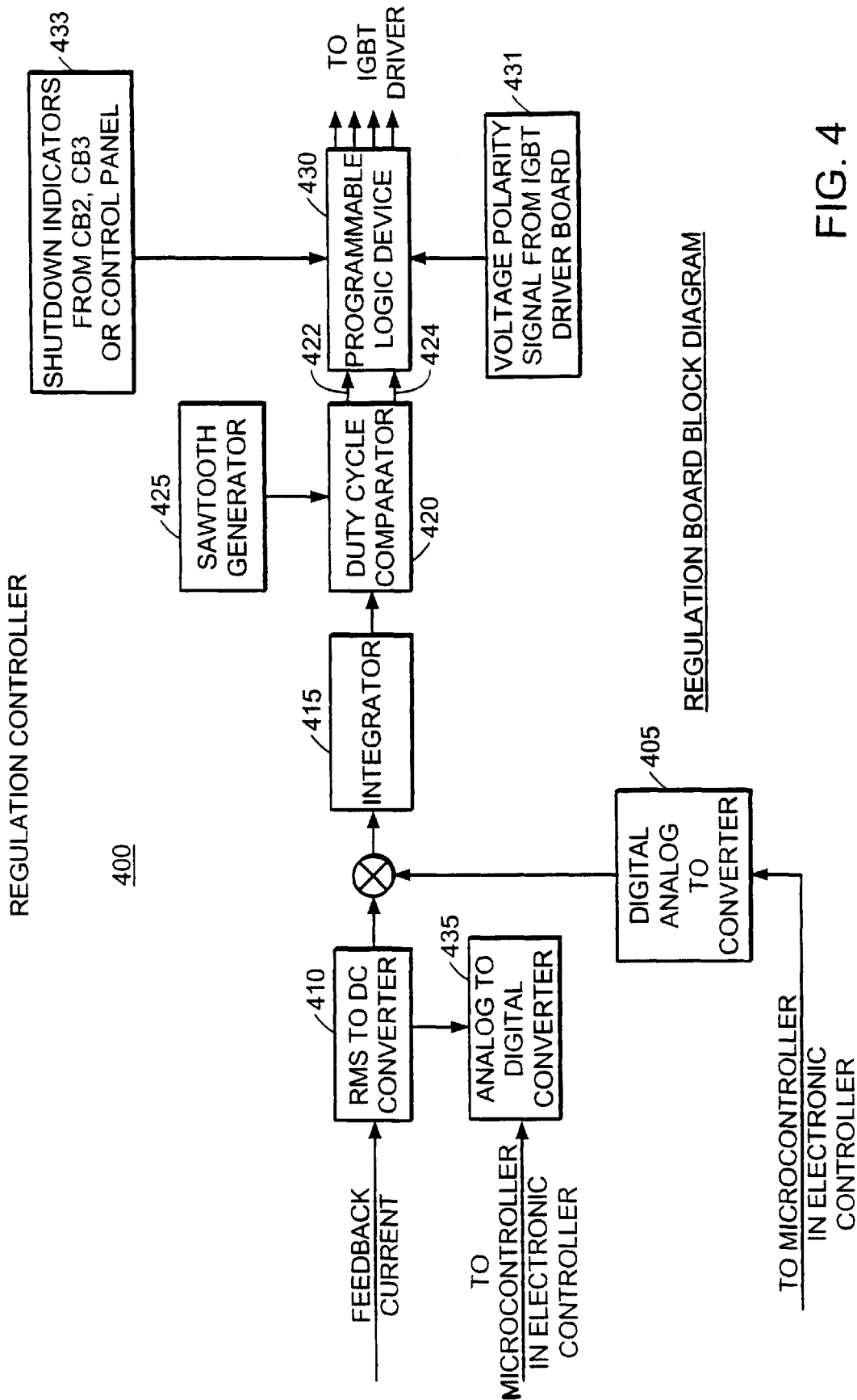
FIG. 4 is a block diagram of a regulation controller of the CCR of FIG. 3.

Referring also to FIG. 4, the electronic controller 345 includes a regulation controller 400 that receives digital input from a microcontroller internal to the electronic controller and generates a signal for the IGBT driver 375. The microcontroller performs all of the input and output functions of the electronic controller 345.

In particular, the regulation controller 400 includes a digital-to-analog converter 405 coupled to the microcontroller and a RMS-to-DC converter 410 that receives the feedback signal from the load current transformer 380. The input and feedback signals are summed and fed to an integrator 415 that integrates the signal.

A duty cycle comparator 420 receives the integrated signal from the integrator 415 and a reference level from a generator 425, and drives the output to a positive or negative value depending on whether the integrated signal is less than or greater than the reference level. The output from the duty cycle comparator 420 includes the PWM signal 422 and a delayed PWM signal (denoted PWMD) 424. The PWMD signal 424 is delayed by a relatively short time T compared with the signal 422 (for example, T is less than or about 1% of a cycle). The PWMD signal 424 is used to control the IGBTs in a manner that prevents overlap of conduction, associated high switching losses, and charge buildup. Typical frequencies for the PWM signal 422 are on the order of 4 kHz.

A programmable logic device 430 receives the PWM signal 422, the PWMD signal 424, and information 431 about the polarity of the AC input voltage from the IGBT driver 375. Additionally, the programmable logic device 430 receives information 433 about shutdown status from various devices in the CCR, including circuit breaker 390, circuit breaker 395, or any manual shutoff from the control panel 120, or directly from the IGBT driver 375. The programmable logic device 430 adjusts digital output to the IGBT driver 375 based on this information.

Additionally, the current feedback from transformer 380 is converted to a digital signal using an analog-to-digital converter 435 and input to the microcontroller for additional processing.

Figure 5:
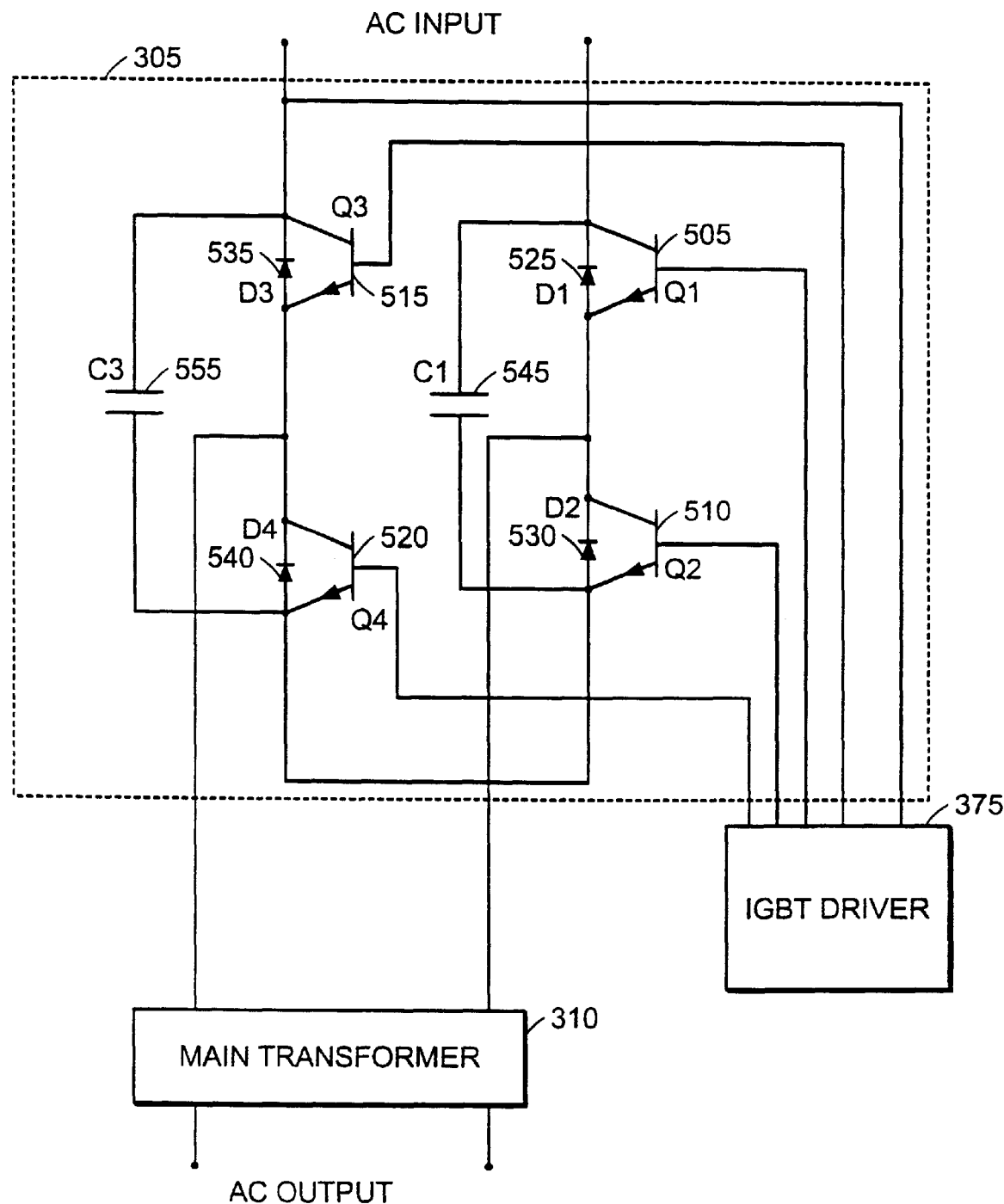
FIG. 5 is a circuit diagram of an insulated gate bipolar transistor (IGBT) power module of the CCR of FIG. 3.

Referring also to FIG. 5, the IGBT power module 305 includes four IGBTs Q1 505, Q2 510, Q3 515, and Q4 520. The two solid state switches in a pair (that is, [Q1, Q2] and [Q3, Q4]) are connected in series with each other and arranged to permit current flow in the same direction (that is, the collector of one switch in the pair is connected to the emitter of the other switch). Each input of the primary winding of the transformer 310 is connected between the two switches to the interface of a pair.

Each IGBT operates as a switch in a circuit that includes an anti-parallel diode between the IGBT emitter and collector. The ON/OFF state of the IGBT is controlled by a voltage $V_g$ supplied by the IGBT driver 375 to the gate of the IGBT. The IGBT driver 375 outputs the voltage $V_g$ to a particular IGBT based on the input from the programmable logic device 430. The IGBT turns on when the gate voltage $V_g$ is greater than some threshold voltage associated with the IGBT. Corresponding diodes are labeled D1 525, D2 530, D3 535, and D4 540. A parallel snubber capacitor C1 545 is included across the collector of Q1 and the emitter of Q2. A parallel snubber capacitor C3 555 is included across the collector of Q3 and the emitter of Q4.

The capacitors C1 and C3 are low inductance snubber capacitors mounted directly across their corresponding IGBTs. Snubber circuits that include the capacitors C1 and C3 reduce reverse recovery transients or voltage overshoots that might otherwise occur. In one implementation, the capacitors C1 and C3 have capacitances of 1.5 $\mu$f, respectively.

Figure 6:
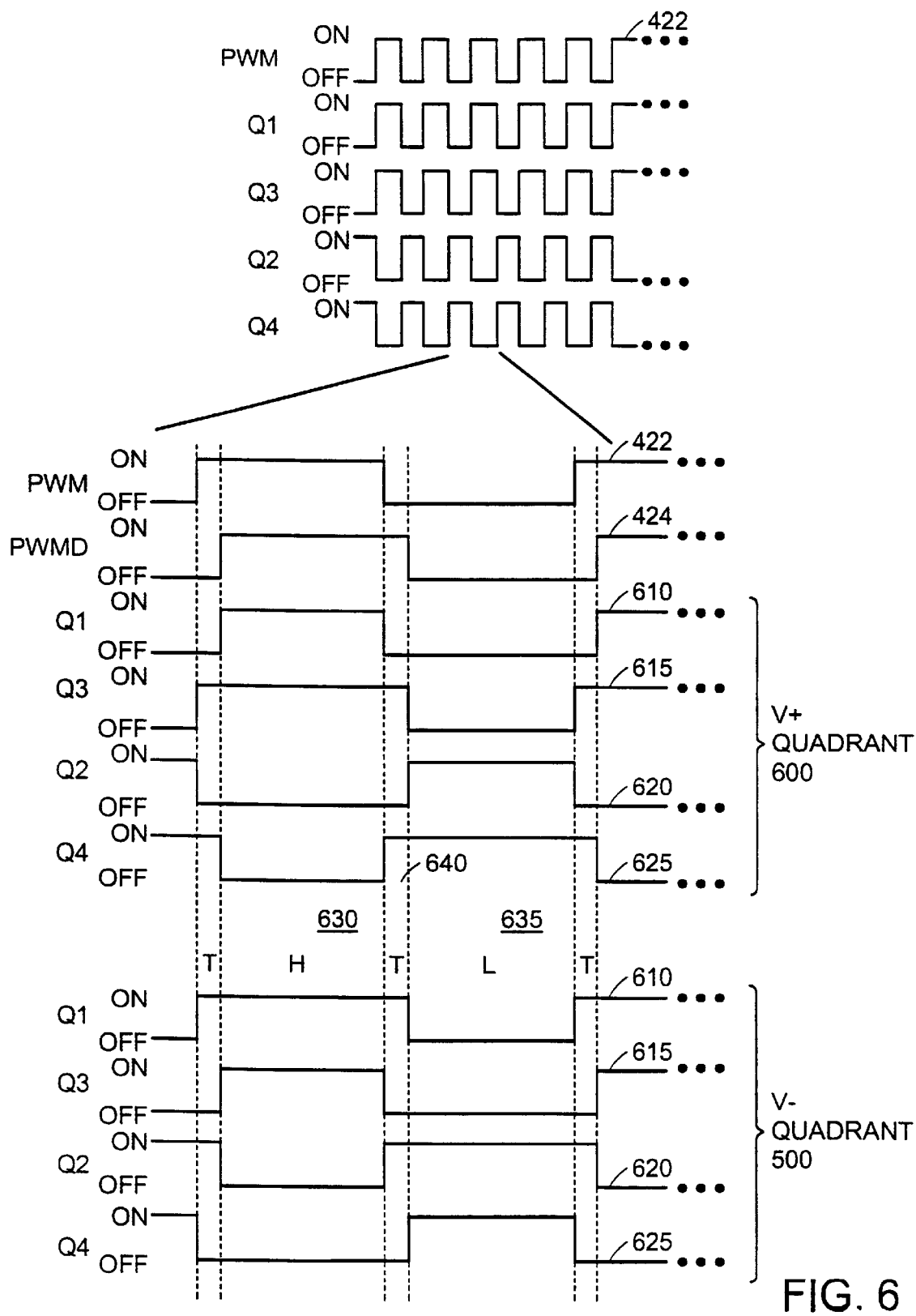
FIG. 6 shows timing diagrams of signals that trigger the IGBTs of the CCR of FIG. 3.

Referring also to FIG. 6, timing diagrams illustrate the PWM signal 422, the PWMD signal 424, and the duty cycle trigger signals that act as the gate signals for the IGBTs during positive AC input voltage polarity (600) and during negative AC input voltage polarity (605). It should be noted that the gate signals, and not the current through the IGBTs, are shown in FIG. 6. The current through the IGBTs varies not only according to the gate signal but also depending on the load current or voltage.

The IGBT driver 375 outputs a gating signal 610 for Q1, a gating signal 615 for Q3, a gating signal 620 for Q2, and a gating signal 625 for Q4. The delay T has been exaggerated in this figure for purposes of illustration. Each of the gating signals 610–625 depends on the PWM signal 422, the PWMD signal 424, which is the PWM signal delayed by time T, and the polarity (TRUE when positive) of the AC input voltage according to the following relationships:

Q1=Polarity AND (PWM AND PWMD) OR NOT Polarity AND (PWM OR PWMD);
Q2=NOT Q3;
Q3=Polarity AND (PWM OR PWMD) OR NOT Polarity AND (PWM AND PWMD); and
Q4=NOT Q1.

There are three distinct periods shown in FIG. 6. During the period H 630, the high side devices, Q1 and Q3, are on, connecting the input line to the load, for either polarity. During the period L 635, the low side devices, Q2 and Q4, are on, and the high side devices are off, thus allowing the load current to circulate with essentially zero voltage applied to the load.

During positive input polarity, and during period T 640, Q1 and Q2 are both off, thus preventing overlapped conduction to reduce losses, and Q2 and Q4 are overlapped, thus preventing trapped charge build-up. During negative input polarity, and during period T 640, Q3 and Q4 are both off, while Q1 and Q2 are overlapped.

Figures 7, 8A:
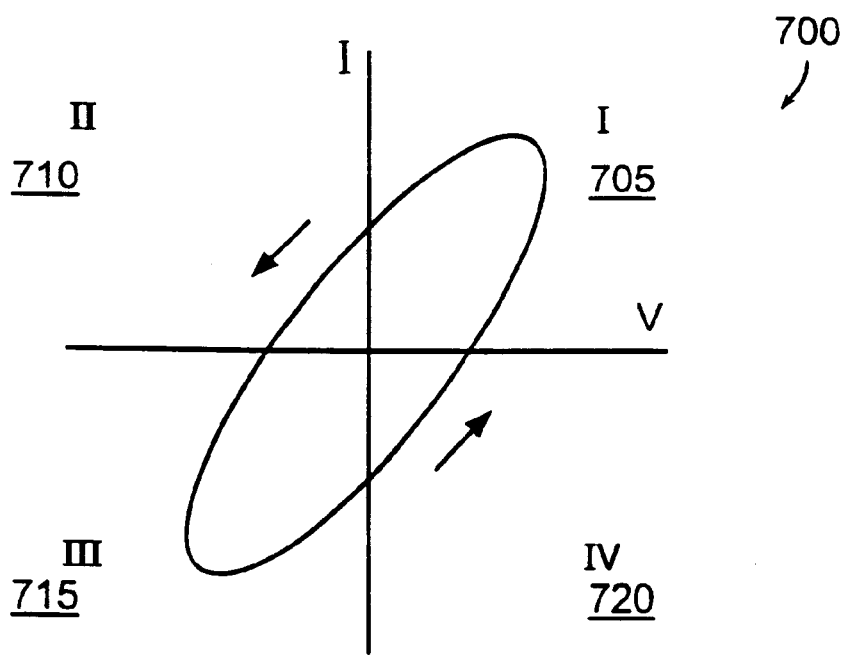
FIG. 7 is a graph of a load trajectory typical for the CCR of FIG. 3.
FIG. 8A is a table showing current flow in specific paths for the IGBT power module of FIG. 5.

AC power quality in the circuit 305 is best and electrical operating efficiency is greatest when the line current is sinusoidal in waveform and in phase with the line voltage. However, many electrical elements, such as reactive loads, shift the line current out of phase by $\theta$ with the line voltage. This phase shift is commonly defined in terms of a power factor that is equal to cos $\theta$. Thus, for a perfect, or in-phase, current-voltage relationship, the power factor is 1 because $\theta$ is 0. A load trajectory 700 showing the phase offset between the line current and the line voltage is shown in FIG. 7.

Because the CCR 300 holds a constant output current at a level set by the air traffic controller, regardless of a number of lamps 110, the CCR 300 could be required to operate at quite low duty cycles for a small number of lamps 110 or a low load value. In this case, the main transformer 310 leakage reactance becomes significant, causing the CCR 300 to operate with the current lagging the voltage as shown in the trajectory 700 of FIG. 7. The power factor for such a low load value is therefore relatively low. As the load power factor improves, the ellipse in FIG. 7 approaches a diagonal line for an ideal purely resistive load. The current and voltage are both positive in quadrant 705, positive and negative in quadrant 710, both negative in quadrant 715, and negative and positive in quadrant 720.

Current flows in specific paths through the CCR 300 depending on the PWM cycle and the load trajectory quadrant of operation. Each quadrant of operation corresponds to a specific current flow path for ON and OFF periods of the PWM cycle. A PWM OFF period corresponds to an inverted PWM ON period. In FIG. 8A, table 800 shows the ON and OFF current flow paths for each quadrant of the load trajectory 700. The main transformer 310 is designated as T1.

Figure 8B:
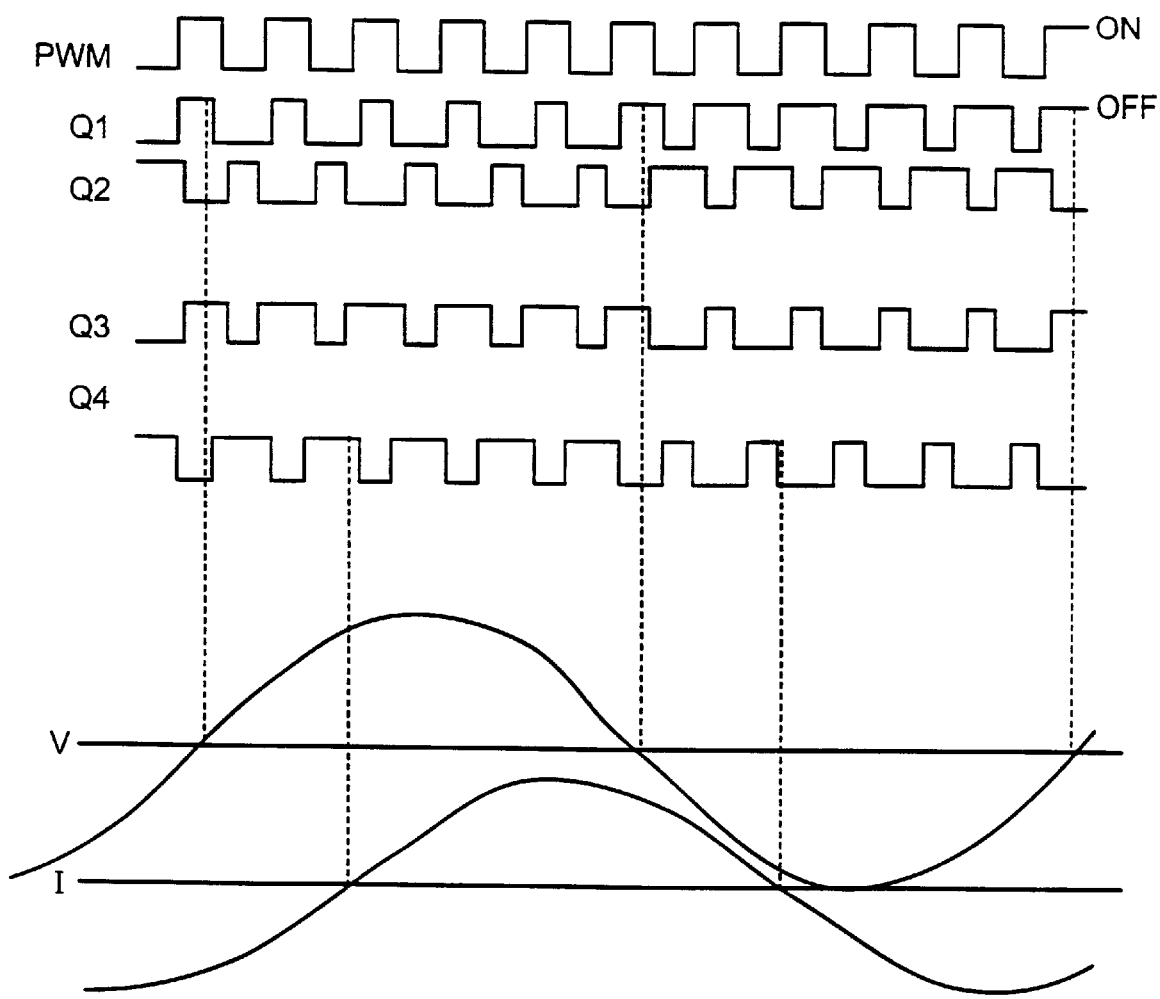
FIG. 8B is a timing diagram showing a control strategy for operating the IGBTs of the power module of FIG. 5.
Figure 8C:
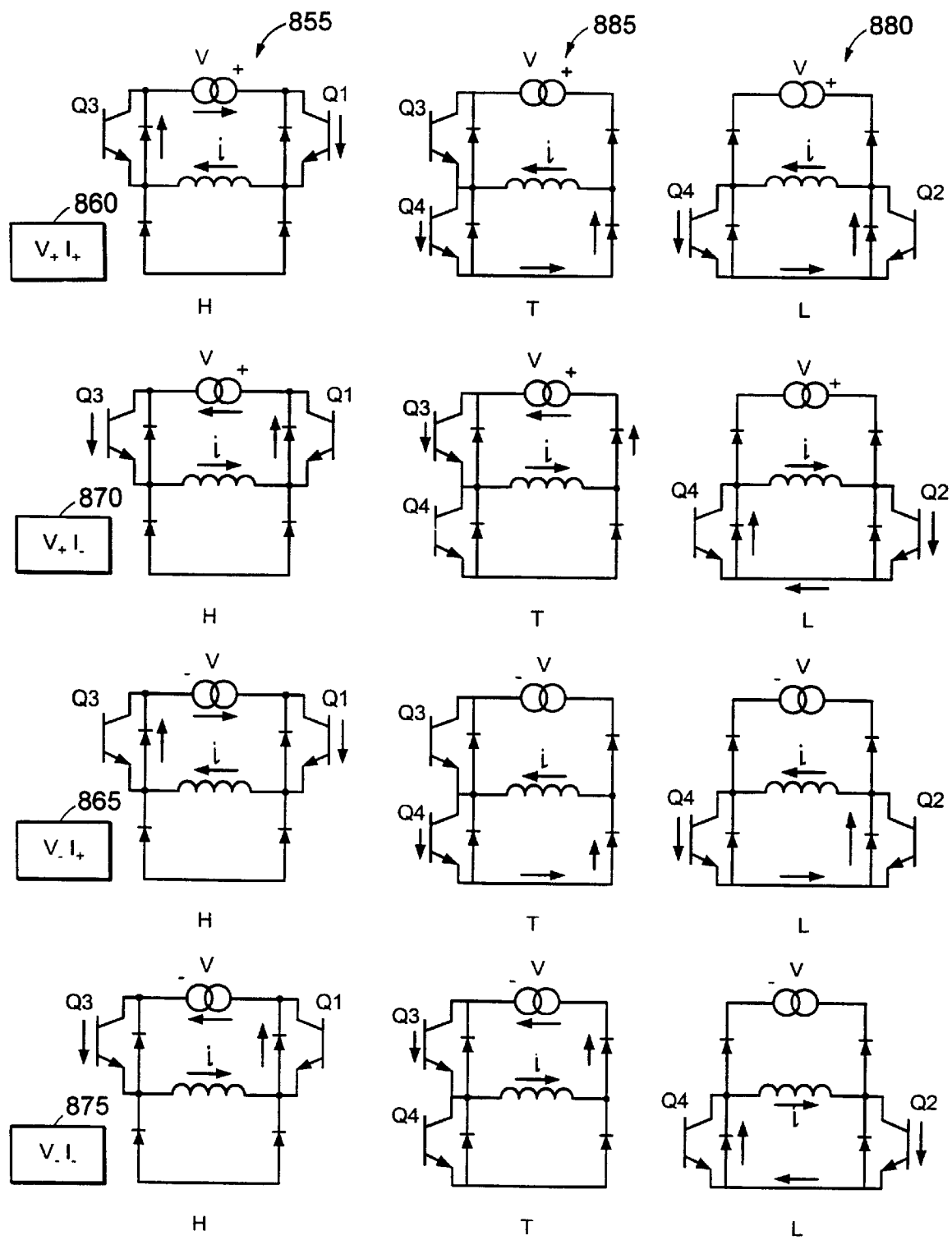
FIG. 8C is a flow path showing the control strategy of FIG. 8B for operating the IGBTs of the power module of FIG. 5.

Referring also to timing diagram 850 of FIG. 8B and to the flow paths for each quadrant of operation as shown in FIG. 8C, operation of the IGBTs is detailed through a complete AC input voltage cycle. As discussed above, and as shown in FIG. 8C, during the H period (denoted as 855 in FIG. 8C) of the PWM cycle, transistors Q1 and Q3 are on, and transistors Q2 and Q4 are off. Current flows through transistor Q1 when the AC input current is positive (that is, in quadrant 860 in which AC input voltage is positive and in quadrant 865 in which AC input voltage is negative). From Q1, the current flows through the main transformer 310 (as opposed to either Q2, which is off, or D2 which is reverse biased). After the main transformer, the current flows through the diode D3. Current flows through transistor Q3 when the AC input current is negative (that is, in quadrant 870 in which AC input voltage is positive and in quadrant 875 in which AC input voltage is negative). From Q3, the current flows through the main transformer 310, and through diode D1.

During the L period (denoted as 880 in FIG. 8C) of the PWM cycle, the primary coil of the transformer 310 is isolated from the input current and discharged. Thus, when current had been flowing through Q1 and D3 during the H period, current flows through Q4 and D2 during the L period. Similarly, when current flows through Q3 and D1 during the H period, current flows through Q2 and D4 during the L period.

During the T period (denoted as 885 in FIG. 8C) of the PWM cycle, current flows through Q4 and D2 when the AC input current is positive, and current flows through Q3 and D1 when AC input current is negative. Thus, inductance of the transformer 310 forces current to continue to circulate through the paths including the IGBTs. Current changes as a function of the resulting voltage applied to the IGBTs.

When the PWM duty cycle is on the order of 4 kHz, approximately 67 PWM cycles are completed during a single AC current cycle.

Operation of the CCR 300 may be modeled in SPICE using representative values. Secondary and load values may be rescaled during modeling to ensure a 1:1 main transformer ratio to improve convergence.

Figures 9, 13A:
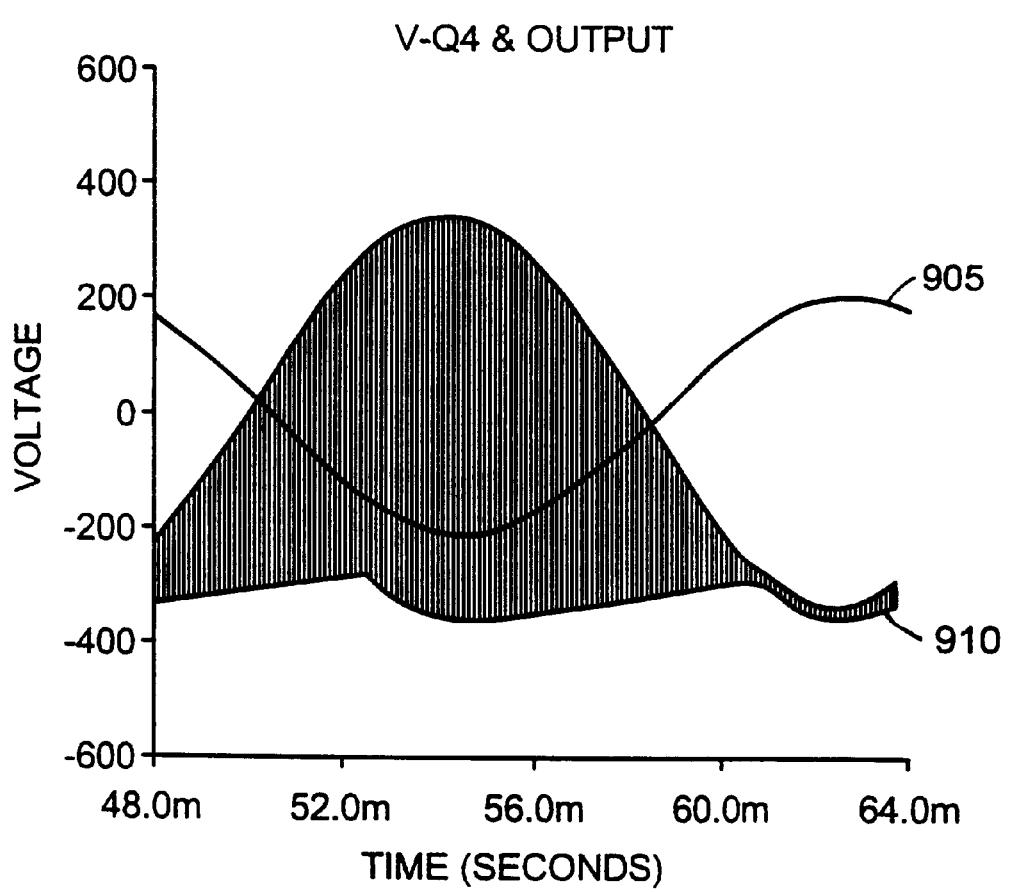
FIG. 9 is a graph of output voltage and voltage across an IGBT for a CCR that uses a bleed resistor to prevent charge accumulation.
FIG. 13A is a table showing a control strategy for preventing charge accumulation in the power module of FIG. 5.

Charge accumulation may be prevented by adding a bleed resistor from a common emitter tie of the IGBTs, which is the most negative point in the circuit 305. FIG. 9 provides a graph 900 illustrating results of this modification. AC output voltage 905 and Q2 voltage from ground to collector 910 are plotted versus time in graph 900. Resistance for the bleeder resistor was 10 kΩ and the resulting added power loss was less than 10 W. This simulation was done with a load resistance representing ⅔ full load and at a 33% duty cycle. In graph 900, there is blocking voltage on the Q2 collector for greater than 180 electrical degrees due to charge accumulation. If, on the other hand, there were no charge accumulation, then voltage on the Q2 collector would last for only 180 degrees. Graph 900 is typical for the waveforms found in real tests.

Figure 10:
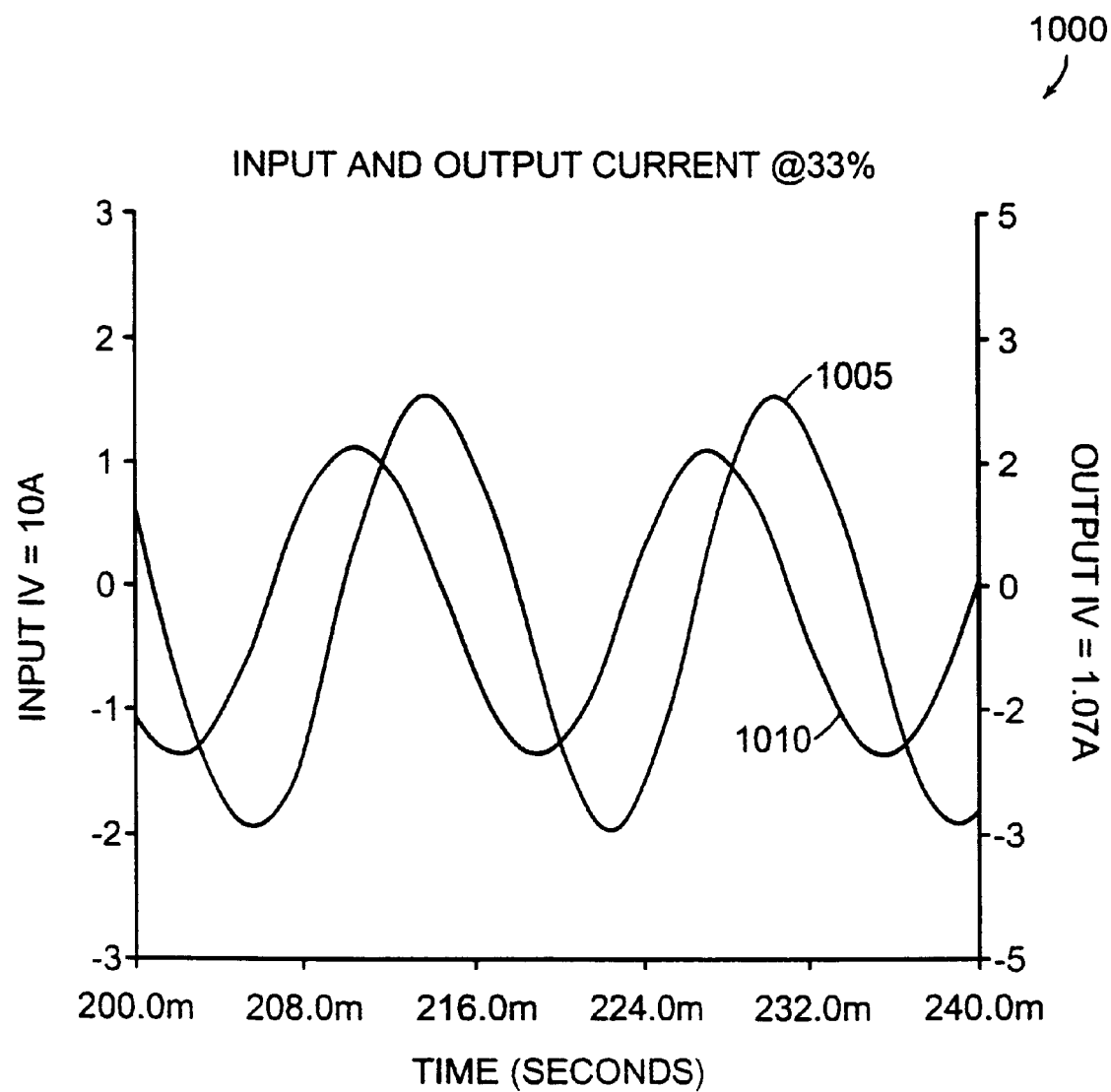
FIG. 10 is a graph of input and output current waveforms for the CCR of FIG. 3.

Referring to FIG. 10, a graph 1000 shows results of a SPICE simulation for input current 1005 and output current 1010. During this simulation, the CCR 300 is operated at a 33% duty cycle, representing a 10 kVA output for a 30 kVA load. The phase shift between input and output currents is due primarily to the capacitor currents for $C_{in}$ and $C_{out}$.

Messages and output current metering may be viewed on the display 350 using light emitting diode (LED) technology. Under normal working conditions, the output current will be displayed in amperes with an "L" or "R" designation displayed beside it to indicate if the CCR 300 is under local control (L) or under remote control (R).

When a key on the keypad 355 is pressed, that button's designation may be displayed on the display 350 for confirmation. In an event of an open circuit or overcurrent shut off, a message may scroll across the display 350 until the CCR 300 is switched in an OFF state.

The CCR circuit lends itself to a simple construction. Conservatively rated IGBT switches allow a convection cooled heatsink design. The two IGBT switches that are paired together (for example, Q1 and Q2) may be mounted side by side on a vertically aligned aluminum heatsink, with the IGBT driver 375 and input capacitor 315 in close proximity. The input capacitor 315 may be a commutation grade AC capacitor and the snubber capacitors C1 and C3 are preferably low inductance type capacitors.

A single-piece laminated bus bar is used to connect the input capacitor into the collectors of Q1 and Q3. Another portion of the laminated bus bar is used to connect the emitters of Q2 and Q4 together. The snubber capacitors C1 and C3 are mounted on top of the laminated bus bar by, for example, fastening the capacitors to the bus bar using nuts and bolts.

The main transformer 310 may be designed with a high primary leakage, and an electrostatic shield to block electromagnetic interference. Taps on the primaries and secondaries of the main transformer permit application over a wide range of load ratings.

Other embodiments are within the scope of the claims.

Figure 11:
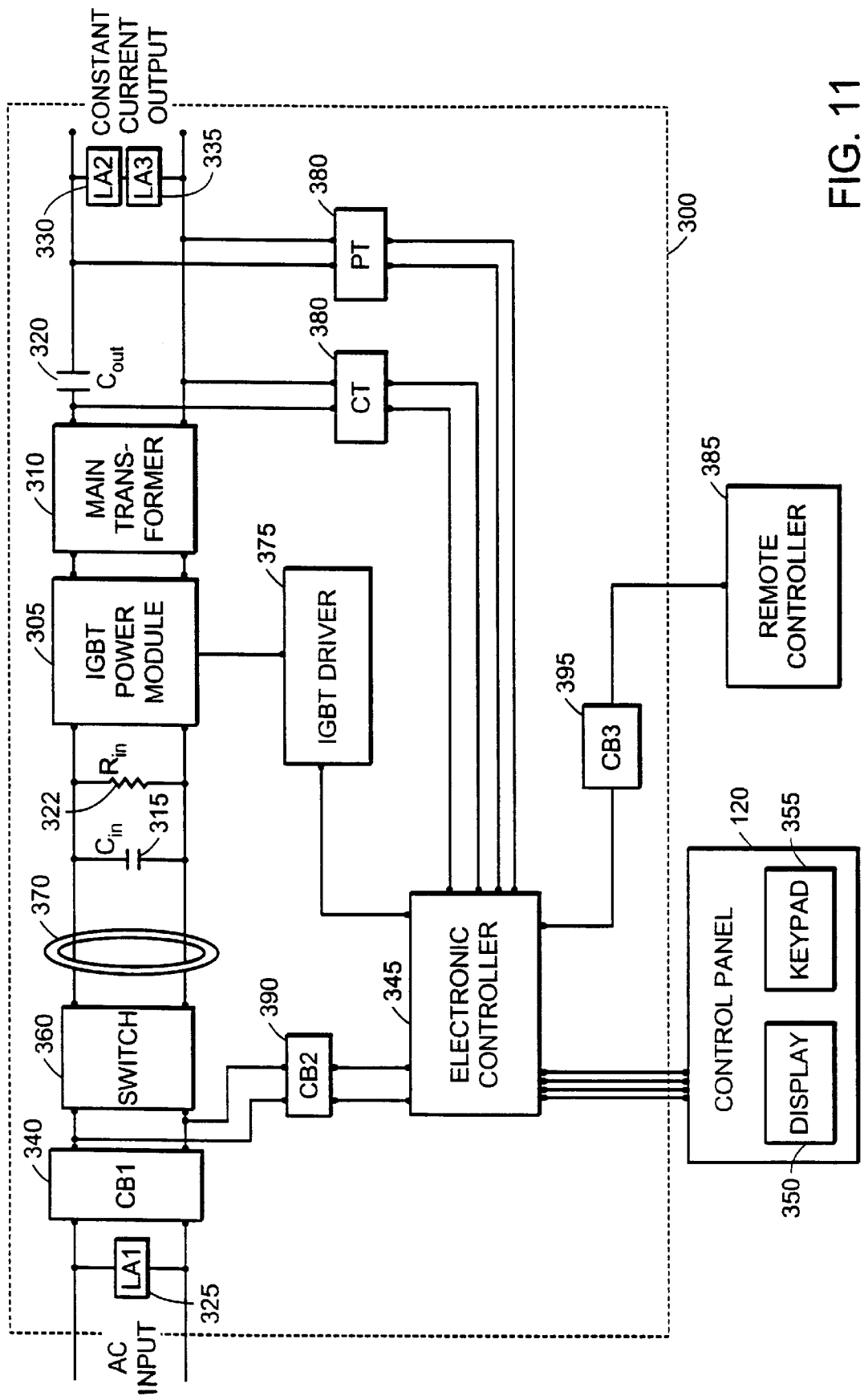
FIG. 11 is a block diagram of the CCR of FIG. 3 that uses a potential transformer in a feedback loop.

For example, referring also to FIG. 11, a potential transformer 1100 may be implemented to provide an additional feedback signal. In one implementation, the potential transformer 1100 has a 200:1 turn ratio for 10 kW units, and a 500:1 turn ratio for 20 and 30 kW units.

A switch may be implemented on the CCR 300 to set a number of brightness steps (for example, 3 or 5 steps) and to clear memory in the electronic controller 345.

A tap on the primary of the main transformer 310 may be selected by the customer and/or preset by the manufacturer. For example, one tap on the primary may be at 380 V, while another tap may be set at 480 V.

Taps on the secondary of the main transformer 310 may be selected by the customer and/or preset by the manufacturer. For example, taps on the secondary may be set at 4, 7.5, and 10 kW for a 10 kW unit.

Figure 12:
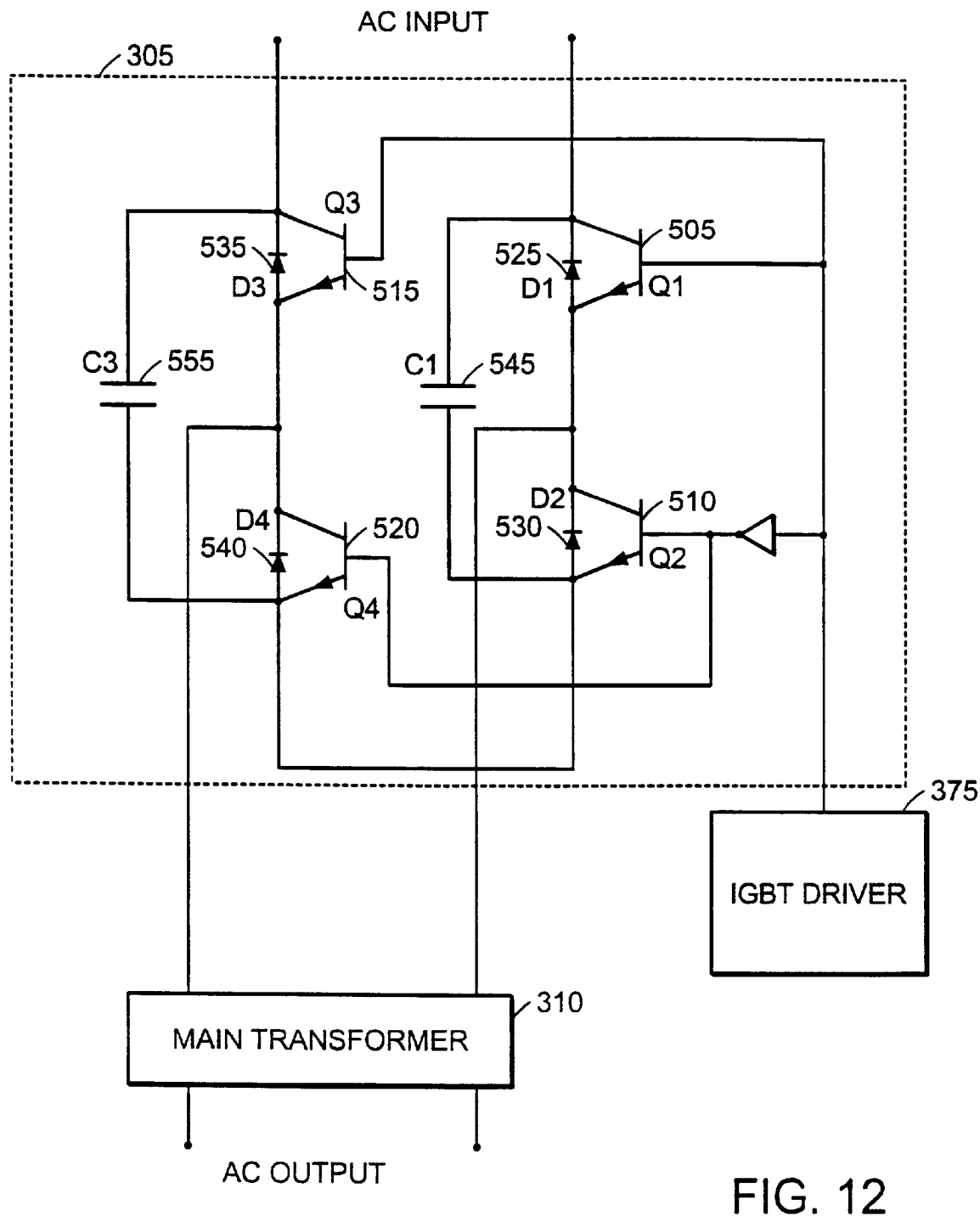
FIG. 12 is a circuit diagram of another IGBT power module for use in the CCR of FIG. 3.

As shown in FIG. 12, Q1 and Q3 may be driven by the fixed PWM signal, while Q2 and Q4 may be driven with the complement of the fixed PWM signal. In this way, the four transistors (Q1–Q4) are controlled to provide desired current flows during ON and OFF states of the PWM duty cycle trigger signal.

Figure 13B:
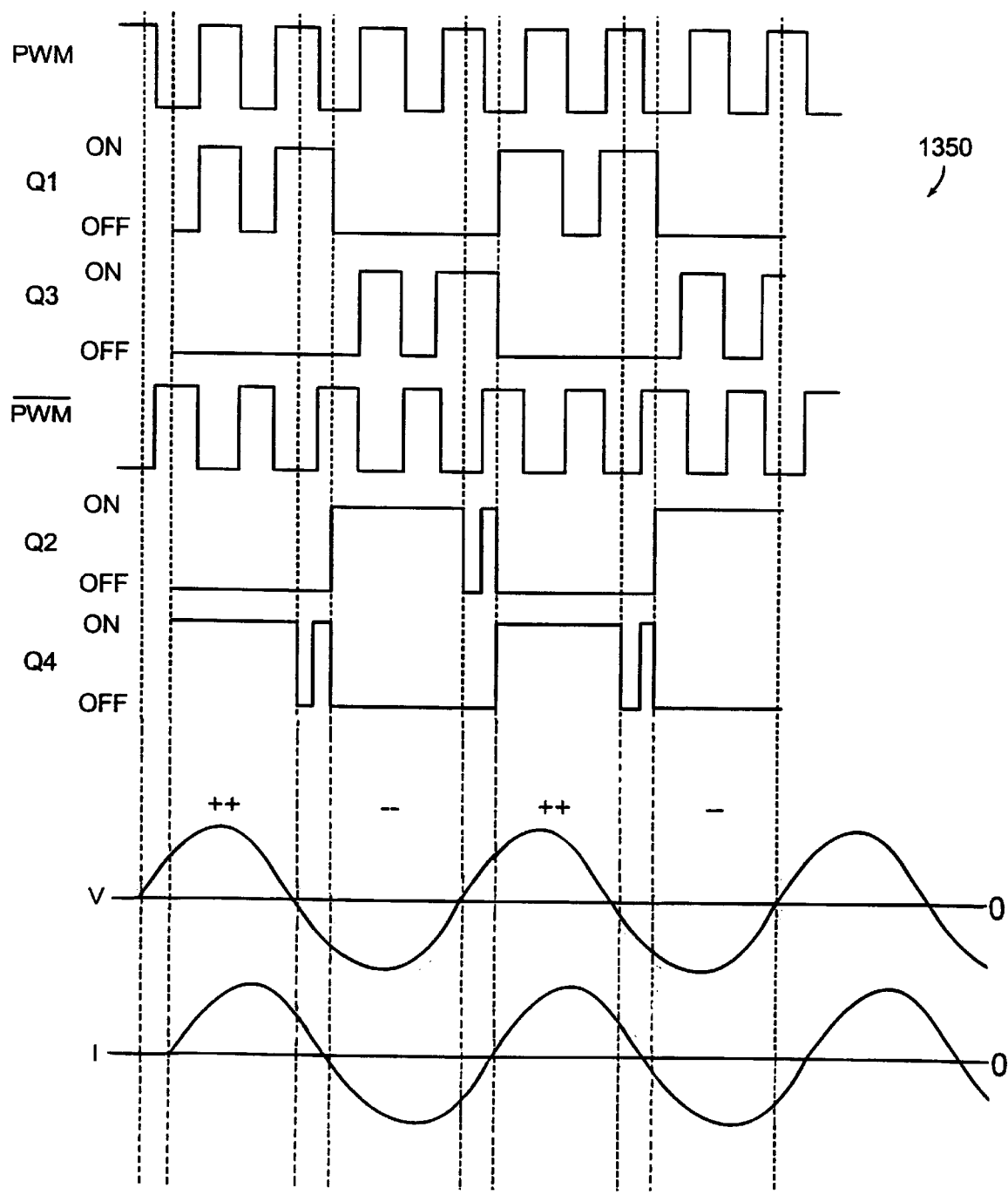
FIG. 13B is a timing diagram showing another control strategy for preventing charge accumulation in the power module of FIG. 5.

Another approach to the above-mentioned problem of charge accumulation, that does not require use of the bleeder resistor, is to change switching strategies according to the quadrant of operation. This strategy leaves only one device switching at a time, which eliminates a timing gap that produces the residual charge. Table 1300 shown in FIG. 13A along with a corresponding timing diagram 1350 shown in FIG. 13B illustrate a required control strategy for such an approach. In this table, δ represents the PWM signal, /δ represents the PWM complement, a 1 is a continuous ON state, and a 0 is a continuous OFF state.

What is claimed is:

1. An airport runway lighting system comprising:
   a series of lights used along the runway;
   an AC source that provides power to the series of lights; and
   a constant current regulator that receives an AC input current from the source at provides a constant AC current to series of lights, the regulator comprising:
     a first electronically controllable switch;
     a second electronically controllable switch;
     a second electronically controllable switch;
     a third electronically controllable switch;
     a fourth electronically controllable switch;
     a transformer coupled to the switches such that:
       an output of the first switch is electrically connected to an input of the second switch and one input of the transformer primary winding, and
       an output of the third switch is electrically connected to an input of the fourth switch and another input of the transformer primary winding; and
     a controller connected to the switches, the controller programmed to:
       provide trigger signals to each of the switches, and
       adjust a duty cycle of the trigger signals based on a comparison between an actual current value and a reference current value to provide a constant AC current to the lights;
   wherein the switches are arranged such that the AC input current is supplied to the transformer primary winding when the trigger signal to the first switch is on and the trigger signal to the third switch is on.

2. The system of claim 1, wherein a trigger signal to a switch is based on a pulse width modulated signal, a delayed pulse width modulated signal, and a polarity of an AC input voltage.

3. The system of claim 1, wherein the switches are arranged such that the AC input current is isolated from the primary winding of the transformer when the trigger signal to the second switch is on and when the trigger signal to the fourth switch is on.

4. The system of claim 1, wherein the electronically controllable switches are insulated gate bipolar transistors (IGBTs), each IGBT having as the output, an emitter, and as the input, a collector.

5. The system of claim 1, further comprising, for each electronically controllable switch, a diode connected in an anti-parallel direction across the output and the input of the switch.

6. The system of claim 5, wherein the inputs of the first and third switches are connected to the AC input.

7. The system of claim 6, wherein the outputs of the second and fourth switches are electrically connected to each other.

8. The system of claim 7, further comprising:
a first capacitor connected across the input of the first switch and the output of the second switch; and
a second capacitor connected across the input of the third switch and the output of the fourth switch.

9. The system of claim 1, wherein the first and fourth switches are reciprocally and cyclically operated so that one of the first and fourth switches is conducting while the other of the first and fourth switches is non-conducting.

10. The system of claim 9, wherein the second and third switches are reciprocally and cyclically operated so that one of the second and third switches is conducting while the other of the second and third switches is non-conducting.

11. The system of claim 1, wherein adjusting the duty cycle of the trigger signal comprises adjusting a conversion ratio between a source voltage and a voltage through the lights.

12. The system of claim 1, wherein adjusting the duty cycle of the trigger signal comprises adjusting a conversion ratio between a source current and a current through the lights.

13. The system of claim 1, wherein the regulator supplies a uniform current to each light in the series such that the lights have uniform brightness.

14. The system of claim 1, wherein the control panel permits the air traffic human controller to adjust the reference current value to change a brightness level of the lights.

15. The system of claim 1, further comprising a control panel connected to the controller and accessible to an air traffic human controller, the control panel permitting monitoring and adjustment of the regulator.

16. The system of claim 1, wherein the output of the transformer is fed back to the controller.

17. The system of claim 16, wherein based on the feedback, the controller compensates for changes in the conditions in the lights to maintain constant current regulation.

18. The system of claim 1, further comprising a feedback transformer coupled to a secondary winding of the transformer, the output of the feedback transformer providing a feedback signal to the controller.

19. The system of claim 18, wherein the actual current value is based on the output signal from the feedback transformer.

20. A constant current regulator that receives an AC input current from a source and provides a constant AC current to a load, the regulator comprising:
a first electronically controllable switch;
a second electronically controllable switch;
a third electronically controllable switch;
a fourth electronically controllable switch;
a transformer coupled to the switches such that:
an output of the first switch is electrically connected to an input of the second switch and one input of the transformer primary winding, and
an output of the third switch is electrically connected to an input of the fourth switch and another input of the transformer primary winding; and
a controller connected to the switches, the controller programmed to:
provide trigger signals to each of the switches, and
adjust a duty cycle of the trigger signals based on a comparison between an actual current value and a reference current value to provide a constant AC current to the load;
wherein the switches are arranged such that the AC input current is supplied to the transformer primary winding when the trigger signal to the first switch is on and the trigger signal to the third switch is on.

21. The regulator of claim 20, wherein a trigger signal to a switch is based on a pulse width modulated signal, a delayed pulse width modulated signal, and a polarity of an AC input voltage.

22. The regulator of claim 20, wherein the switches are arranged such that the AC input current is isolated from the primary winding of the transformer when the trigger signal to the second switch is on and when the trigger signal to the fourth switch is on.

23. The regulator of claim 20, wherein the electronically controllable switches are insulated gate bipolar transistors (IGBTs), each IGBT having as the output, an emitter, and as the input, a collector.

24. The regulator of claim 20, further comprising, for each electronically controllable switch, a diode connected in an anti-parallel direction across the output and the input of the switch.

25. The regulator of claim 24, wherein the inputs of the first and third switches are connected to the AC input.

26. The regulator of claim 25, wherein the outputs of the second and fourth switches are electrically connected to each other.

27. The regulator of claim 26, further comprising:
a first capacitor connected across the input of the first switch and the output of the second switch; and
a second capacitor connected across the input of the third switch and the output of the fourth switch.

28. The regulator of claim 20, wherein:
the first and fourth switches are reciprocally and cyclically operated so that one of the first and fourth switches is conducting while the other of the first and fourth switches is non-conducting; and
the second and third switches are reciprocally and cyclically operated so that one of the second and third switches is conducting while the other of the second and third switches is non-conducting.

29. The regulator of claim 20 wherein adjusting the duty cycle of the trigger signal comprises adjusting a conversion ratio between a source voltage and a load voltage.

30. The regulator of claim 20, wherein adjusting the duty cycle of the trigger signal comprises adjusting a conversion ratio between a source current and a load current.

31. The regulator of claim 20, wherein the load comprises one or more lamps in series.

32. The regulator of claim 31, wherein the regulator supplies a uniform current to each lamp in the series such that the lamps have uniform brightness.

33. The regulator of claim 32, wherein the reference value is based on a selected brightness level for the lamps.

34. The regulator of claim 20, wherein output of the transformer is fed back to the controller.

35. The regulator of claim 34, wherein based on the feedback, the controller compensates for changes in the conditions in the load to maintain constant current regulation.

36. The regulator of claim 20, wherein there is always at least one switch conducting.

37. The regulator of claim 20, wherein the controller is programmed to open a protection switch connected to the AC input and stop providing a trigger signal to the first, second, third, and fourth switches upon detection of a fault in the AC line.

38. The regulator of claim 20, wherein a control panel is connected to the controller, the control panel permitting monitoring and adjustment of the regulator.

39. The regulator of claim 20, further comprising input filtering provided by reactance of the AC source in conjunction with an input capacitor.

40. The regulator of claim 35, further comprising output filtering provided by leakage reactance of the transformer in conjunction with an output capacitor.

41. The regulator of claim 35, further comprising a safety resistor connected in parallel with an input capacitor to safely discharge when AC input current is removed from the regulator.

42. The regulator of claim 20, wherein the regulator is used in an airport lighting system to provide a uniform current to each lamp in a series lamp circuit so that lamps have uniform brightness.

43. The regulator of claim 20, further comprising a feedback transformer coupled to a secondary winding of the transformer, the output of the feedback transformer providing a feedback signal to the controller.

44. The regulator of claim 43, wherein the actual current value is based on the output from the feedback transformer.

45. A method of providing a constant AC output current to a load, the method comprising:
    receiving an AC input current from an AC source;
    providing a first trigger signal to a first electronically controllable switch;
    providing a second trigger signal to a second electronically controllable switch;
    providing a third trigger signal to a third electronically controllable switch;
    providing a fourth trigger signal to a fourth electronically controllable switch;
    electrically connecting an output of the first switch to an input of the second switch and an input of the primary winding of a transformer;
    electrically connecting an output of the third switch to an input of the fourth switch and a second input of the primary winding of the transformer;
    adjusting a duty cycle of the trigger signals based on a comparison between an actual current value and a reference current value to provide a constant AC output current to the load; and
    supplying the AC input current to the primary winding of the transformer when the first and third trigger signals are on.

46. The method of claim 45, further comprising isolating the AC input current from the primary winding of the transformer when the second and fourth trigger signals are on.

47. The method of claim 45, wherein the electronically controllable switches are insulated gate bipolar transistors.

48. The method of claim 45, wherein:
    the load comprises a series of lamps that provide lighting for an airport, and
    the reference current value is provided by an air traffic controller, the reference current value setting a brightness level for the lamps in the series.

49. The method of claim 45, further comprising:
    reciprocally and cyclically operating the first and fourth switches so that one of the first and fourth switches is conducting while the other of the first and fourth switches is non-conducting, and
    reciprocally and cyclically operating the second and third switches so that one of the second and third switches is conducting while the other of the second and third switches is non-conducting.

50. The method of claim 45, wherein adjusting the duty cycle of the trigger signals comprises adjusting a conversion ratio between a source voltage and a load voltage.

51. The method of claim 45, wherein adjusting the duty cycle of the trigger signals comprises adjusting a conversion ratio between a source current and a load current.

52. The system of claim 1, wherein the first and third switches are connected in series with the inputs of the transformer primary winding.

53. The system of claim 1, wherein the first and third switches are connected in series with the AC input current.

54. The system of claim 1, wherein the second and fourth switches are connected in parallel with the AC input current.

55. The system of claim 1, wherein the transformer secondary winding is connected in parallel across the AC output current.

56. The system of claim 1, wherein the second and fourth switches are electrically connected in parallel across the inputs of the transformer primary winding.

57. The regulator of claim 20, wherein the first and third switches are connected in series with the inputs of the transformer primary winding.

58. The regulator of claim 20, wherein the first and third switches are connected in series with the AC input current.

59. The regulator of claim 20, wherein the second and fourth switches are connected in parallel with the AC input current.

60. The regulator of claim 20, wherein the transformer secondary winding is connected in parallel across the AC output current.

61. The regulator of claim 20, wherein the second and fourth switches are electrically connected in parallel across the inputs of the transformer primary windings.

62. The method of claim 45, further comprising connecting the first and third switches in series with the inputs of the transformer primary winding.

63. The method of claim 45, further comprising connecting the first and third switches in series with the AC input current.

64. The method of claim 45, further comprising connecting the second and fourth switches in parallel with the AC input current.

65. The method of claim 45, further comprising connecting the transformer secondary winding across the AC output current.

66. The method of claim 45, further comprising electrically connecting the second and fourth switches in parallel across the inputs of the primary winding of the transformer.

* * * * *